United States Patent
Pascovici et al.

(10) Patent No.: US 8,607,140 B1
(45) Date of Patent: Dec. 10, 2013

(54) CLASSIFYING CHANGES TO RESOURCES

(75) Inventors: Andrei Pascovici, Bellevue, WA (US);
Xiaodong Fu, Sammamish, WA (US);
Theodore Vassilakis, Kirkland, WA (US); Zhen Lin, Bellevue, WA (US)

(73) Assignee: Google Inc., Mountain View, CA (US)

( * ) Notice: Subject to any disclaimer, the term of this patent is extended or adjusted under 35 U.S.C. 154(b) by 480 days.

(21) Appl. No.: 12/973,977

(22) Filed: Dec. 21, 2010

(51) Int. Cl.
*G06F 17/00* (2006.01)

(52) U.S. Cl.
USPC ........... 715/229; 715/255; 715/234; 715/205; 715/206

(58) Field of Classification Search
USPC .......................... 715/229, 234, 205–206, 255
See application file for complete search history.

(56) References Cited

U.S. PATENT DOCUMENTS

| | | | |
|---|---|---|---|
| 4,807,182 A * | 2/1989 | Queen ........................ | 715/210 |
| 5,479,654 A | 12/1995 | Squibb | |
| 5,890,164 A | 3/1999 | Nielsen | |
| 6,012,087 A | 1/2000 | Freivald et al. | |
| 6,895,414 B2 * | 5/2005 | Ford et al. ............... | 1/1 |
| 6,978,419 B1 * | 12/2005 | Kantrowitz ................... | 715/209 |
| 6,990,628 B1 * | 1/2006 | Palmer et al. ................ | 715/234 |
| 6,996,817 B2 * | 2/2006 | Birum et al. .................. | 717/170 |
| 7,185,277 B1 * | 2/2007 | Bernstein et al. ........... | 715/210 |
| 7,487,190 B2 * | 2/2009 | Black et al. ............ | 1/1 |
| 7,519,949 B2 * | 4/2009 | Massaro et al. .............. | 717/120 |
| 7,580,993 B2 * | 8/2009 | Schwerk ................ | 709/223 |
| 8,121,989 B1 * | 2/2012 | Gengelbach .............. | 707/695 |
| 8,196,030 B1 * | 6/2012 | Wang et al. ................. | 715/200 |
| 8,230,325 B1 * | 7/2012 | Sun et al. ................. | 715/229 |
| 2002/0002567 A1 * | 1/2002 | Kanie et al. .................. | 707/513 |
| 2002/0120648 A1 * | 8/2002 | Ball et al. .................. | 707/511 |
| 2003/0120654 A1 * | 6/2003 | Edlund et al. .................. | 707/7 |
| 2004/0205539 A1 * | 10/2004 | Mak et al. .................... | 715/511 |
| 2004/0255237 A1 * | 12/2004 | Tong ......................... | 715/501.1 |
| 2006/0095521 A1 * | 5/2006 | Patinkin ....................... | 709/206 |
| 2008/0034282 A1 * | 2/2008 | Zernik .......................... | 715/229 |
| 2010/0318892 A1 * | 12/2010 | Teevan et al. ................. | 715/229 |

OTHER PUBLICATIONS

Liu et al, "WebCQ—Detecting and Delivering Information Changes on the Web", 2000, 8 pages.*
CompareSuite, "CompareSuite 6.0", CompareSuite, Jan 4-7, 2010, 5 pages. http://web.archive.org/web/20100107164300/http://www.comparesuite.com/?; http://web.archive.org/web/20100104092755/http://comparesuite.com/screenshots/screenshots-01.htm; http://web.archive.org/web/20100105093719/http://www.comparesuite.com/screenshots/screenshots-02.htm.*

* cited by examiner

*Primary Examiner* — Cesar Paula
*Assistant Examiner* — David Faber
(74) *Attorney, Agent, or Firm* — Fish & Richardson P.C.

(57) ABSTRACT

Methods, systems, and apparatus, including computer programs encoded on a computer storage medium, for classifying changes to resources. In one aspect, a method includes obtaining a first version of a resource. The method includes obtaining a second version of the resource, the second version representing a change to the first version of the resource. The method includes determining feature data that describes changes from the first version to the second version. The method includes creating a feature vector from the feature data. The method includes providing the feature vector to a support vector machine, the support vector machine trained to classify the second version of the resource as having one of changes requiring a change notification or changes not requiring a change notification. The method includes classifying the second version as requiring a change notification or not requiring a change notification based on output from the support vector machine.

26 Claims, 7 Drawing Sheets

CLASSIFYING CHANGES TO RESOURCES

BACKGROUND

This specification relates to classifying changes to resources.

Some resources on the World Wide Web are frequently updated, and some resources are rarely updated. Often a web site publisher will configure its web site to provide updates to users when the publisher updates a resource and deems the change significant. For example, the web site may generate a really simple syndication (RSS) document, or "feed" when a new news story is added to its homepage, and the RSS feed provides a brief synopsis of the news story. Alternatively, the web site will not generate a change notification for changes deemed to be of little or no significance, such as an update to a copyright notice to reflect a new year.

Aggregators are programs that allow users to subscribe to web feeds. Aggregators are client software installed on a computer or a web application accessible through a browser. Using the aggregators, users receive the change notifications, and can navigate directly to the resources for which the changes are indicated.

There are many resources, however, for which change notifications are not provided for any changes. For example, many sites do not provide RSS feeds that indicate new content, etc.

SUMMARY

This specification describes technologies relating to classifying changes in resources as either warranting a change notification or as not warranting a change notification.

In general, one innovative aspect of the subject matter described in this specification can be embodied in methods that include the actions of obtaining a first version of a resource. The actions include obtaining a second version of the resource, the second version representing a change to the first version of the resource. The actions include determining feature data that describes changes from the first version to the second version. The actions include creating a feature vector from the feature data. The actions include providing the feature vector to a support vector machine, the support vector machine trained to classify the second version of the resource as having one of changes requiring a change notification or changes not requiring a change notification. The actions also include classifying the second version as requiring a change notification or not requiring a change notification based on output from the support vector machine. Other embodiments of this aspect include corresponding systems, apparatus, and computer programs, configured to perform the actions of the methods, encoded on computer storage devices.

In general, another innovative aspect of the subject matter described in this specification can be embodied in methods that include the actions of obtaining a plurality of resource version pairs, each resource version pair having a first version of a resource obtained at a first time and a second version of the resource obtained at a second time. The actions include obtaining a plurality of change notifications for a proper subset of the resource version pairs, each of the change notifications identifying change occurring between a first version and a second version of a resource to which the change notification corresponds. For each resource version pair the actions include creating a feature vector, based, at least in part, on differences between the first version and the second version. For each resource version pair the actions include creating a notification indicator for the resource version pair, the notification indicator indicating if a change notification exists for the corresponding resource version pair. The actions also include training a classifier to classify the second version of the resource as having one of changes requiring a change notification or changes not requiring a change notification using the feature vectors and the corresponding indicators.

In general, another aspect of the subject matter described in this specification can be embodied in methods that include the actions of generating a change notification in response to classifying the second version of the resource as having a change requiring notification, the change notification including change data describing at least one change from the first version to the second version. Determining feature data may include determining content feature data that describes changes in the content from the first version to the second version, and determining structure feature data that describes changes in link relationships between the first version and a first plurality of other resources and link relationships between the second version and a second plurality of other resources. The resource may be an HTML page; and determining content feature data may include calculating an element count difference based on a count of HTML elements occurring in the first version and a count of HTML elements occurring in the second version, and creating content features based on the element count difference. Determining structure feature data may include identifying a first number of resources in the first plurality of other resources that link to the first version, identifying a second number of resources in the second plurality of other resources that link to the second version, and creating the structure feature data based on the first number and the second number. Determining structure feature data may also include identifying a first set of anchor text from the links of the first plurality of other resources to the first version, identifying a second set of anchor text from the links of the second plurality of other resources to the second version, and creating structure feature data based on the first set of anchor text and the second set of anchor text. Determining content feature data may include calculating a term count difference based on a count of terms in the first version and a count of terms in the second version; calculating a delta term count based on a number of terms deleted from the first version to produce the second version, a number of terms added to the first version to produce the second version, and a number of terms changed in the first version to produce the second version; and creating content feature data based on the term count difference and the delta term count. The methods may also include the actions of determining traffic feature data based on interactions of a first plurality of users with the first version and interactions of a second plurality of users with the second version. Determining traffic feature data may include determining a first count of user interactions with the first version, determining a second count of user interactions with the second version, and creating traffic feature data based on the first count and the second count. Determining traffic feature data includes determining a first count of a number of times a search result identifying the first version was presented in response to a search queries submitted to a search engine, and determining a second count of a number of times a search result identifying the second version was presented in response to a query submitted by a user of the second plurality of users; and creating traffic feature data based on the first count and the second count. Determining traffic feature data may include determining a first count of queries submitted by the first plurality of users and for which search results identifying the first version were generated, determining a second count of queries submitted by the second plurality of users and for which search results identifying the second version were generated, and creating a traffic feature data based on the first count and the second count. Each of the resources may be associated with a web feed, and the change notification may be a change notification corresponding to the first version and the second version of the corresponding resource. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Change notification, e.g., web feed entries, are generated for resources that do not support a web feed. A machine learned model makes the decision to generate change notifications for these resources, and the model is trained on actual change notifications generated for other resources. The actual change notifications are generated for changes that have been deemed significant (e.g., changes that other web site publishers have deemed significant enough to warrant an RSS feed), and thus the decision to generate a change notification is an evolved behavior based on this empirical data. By learning and recognizing such complex patterns, the machine learned model avoids the need for a subjective human evaluation of the change. This allows for the provisioning of near real-time change notifications for thousands of resources for which change notifications would not otherwise be provided. Non important changes can be filtered, presenting only the important changes.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Significant changes to resources (such as hyper-text markup language (HTML) pages) can be identified so that an aggregator can track significant changes to those resources even when the web pages do not provide a web feed. A resource may, but need not, correspond to a file. A resource may be stored in a portion of a file that holds other resources, in a single file dedicated to the resource in question, or in multiple coordinated files. By using historical data from resources that provide web feeds, a support vector machine (SVM) can be trained to detect which updates to resources should result in change notifications (for example, web feed entries).

Figure 1:
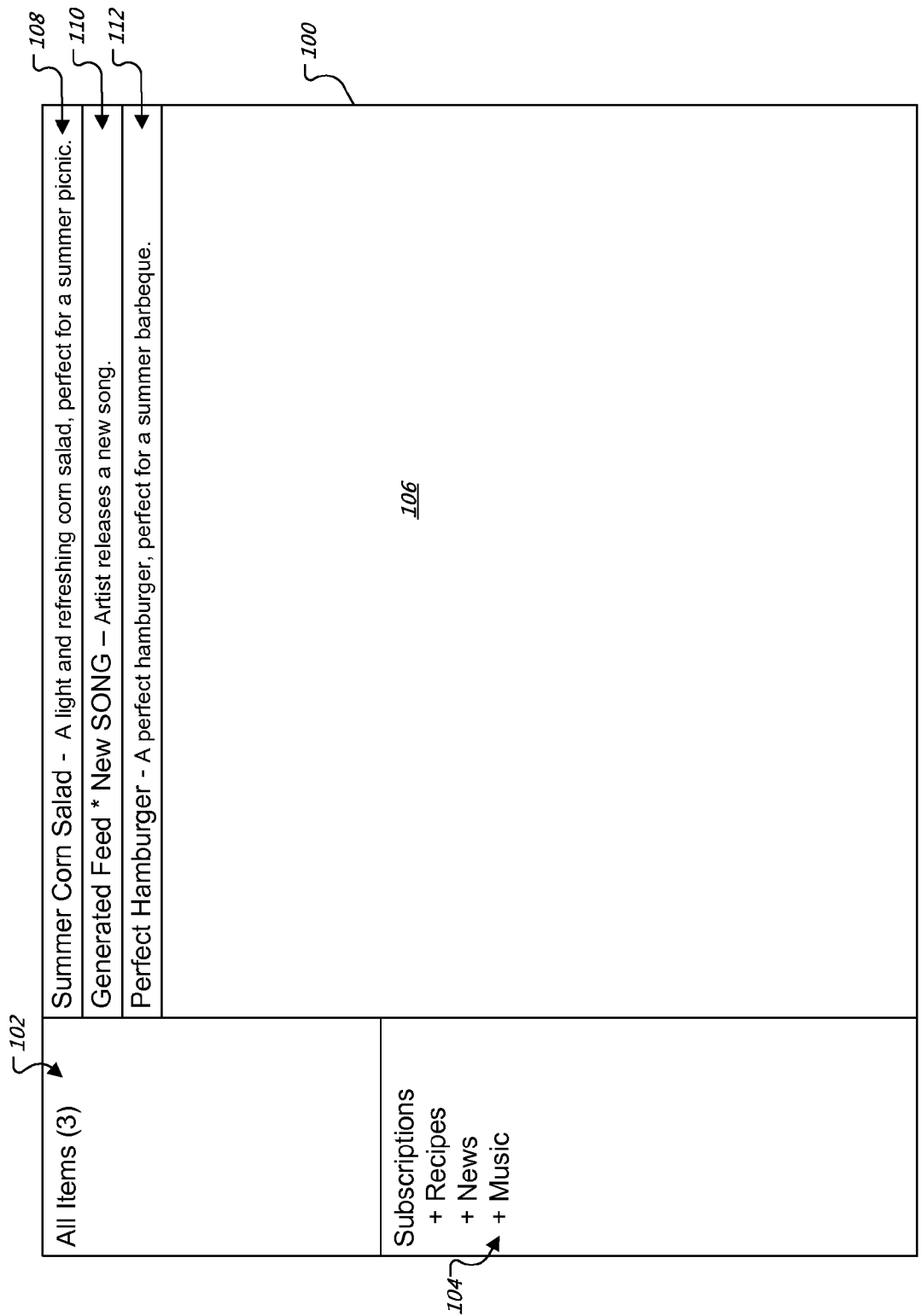
FIG. 1 illustrates an example user interface for an aggregator of web feeds.

FIG. 1 illustrates an example user interface for an aggregator of web feeds. An aggregator is an application that allows users to subscribe to the web feed (for example, a Real Simple Syndication (RSS) feed or an Atom feed) and to be notified of changes to the corresponding resources for which notifications are received. Aggregators can be standalone applications, integrated with a web browser, or offered as a service presented as an HTML page in a web browser. Typically, a user will subscribe to a web feed and the aggregator will notify the user when a new change notification is received. Generally, the aggregator checks the web feeds periodically for updates. Referring to FIG. 1, an aggregator user interface 100 has several display areas. The display area 102 in the upper left of the aggregator user interface 100 informs the user of the number of unread change notifications remaining from the subscribed web feeds. The display area 104 in the lower left of the aggregator user interface 100 displays a list of the web feeds to which the user has subscribed. In this example, the user has subscribed to a "recipe", "news", and "music" web feed.

The right hand side of the aggregator user interface 100 contains a display area 106. The display area 106 displays a list of change notifications. In this example, the aggregator 100 displays three change notifications including an item for a "summer corn salad" recipe 108, an item for a new song just released by an artist 110, and a "perfect hamburger" recipe 112.

Not all web sites provide web feeds. Nevertheless, users of the aggregator may still desire to track updates to the resources. As described below, a system can analyze resources which support web feeds. As the resource is changed, some of the changes will correspond to change notifications and some of the changes will not. By analyzing the changes, the system can identify changes for resources, which do not support web feeds, and that are of the type that typically result in the creation of a change notification. Once identified, the system can generate a change notification for those changes. In this example, the aggregator user interface 100 displays a change notification 110 labeled "Generated Feed" indicating that the item came from a resource that is not paired with a web feed.

Figure 2A:
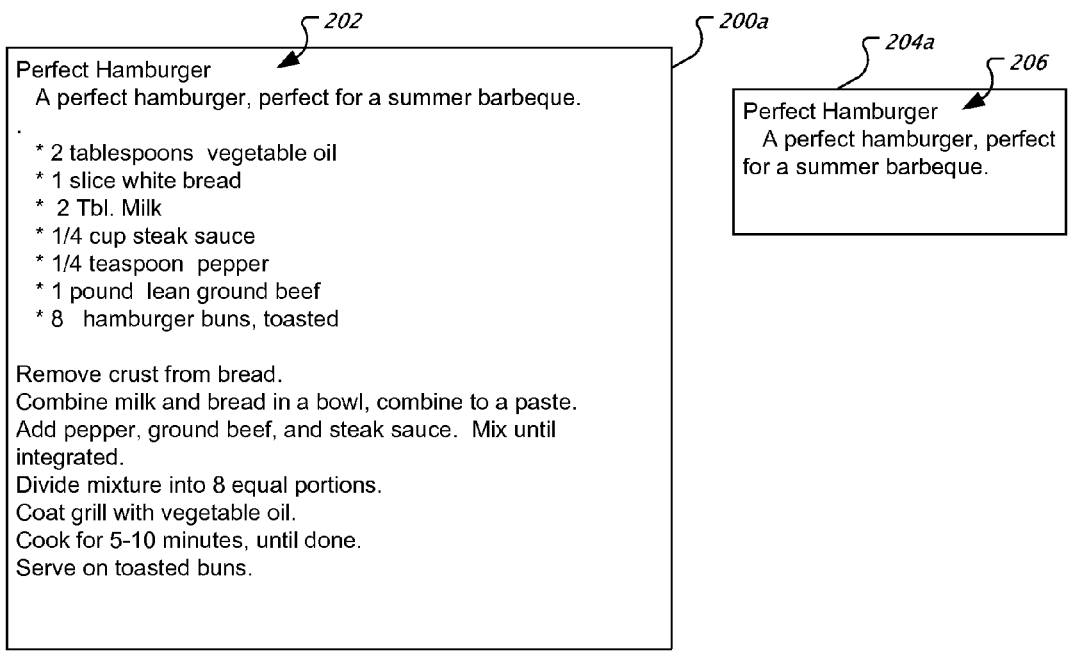
FIGS. 2A and 2B illustrate two versions of an example resource paired with an example web feed.
Figure 2B:
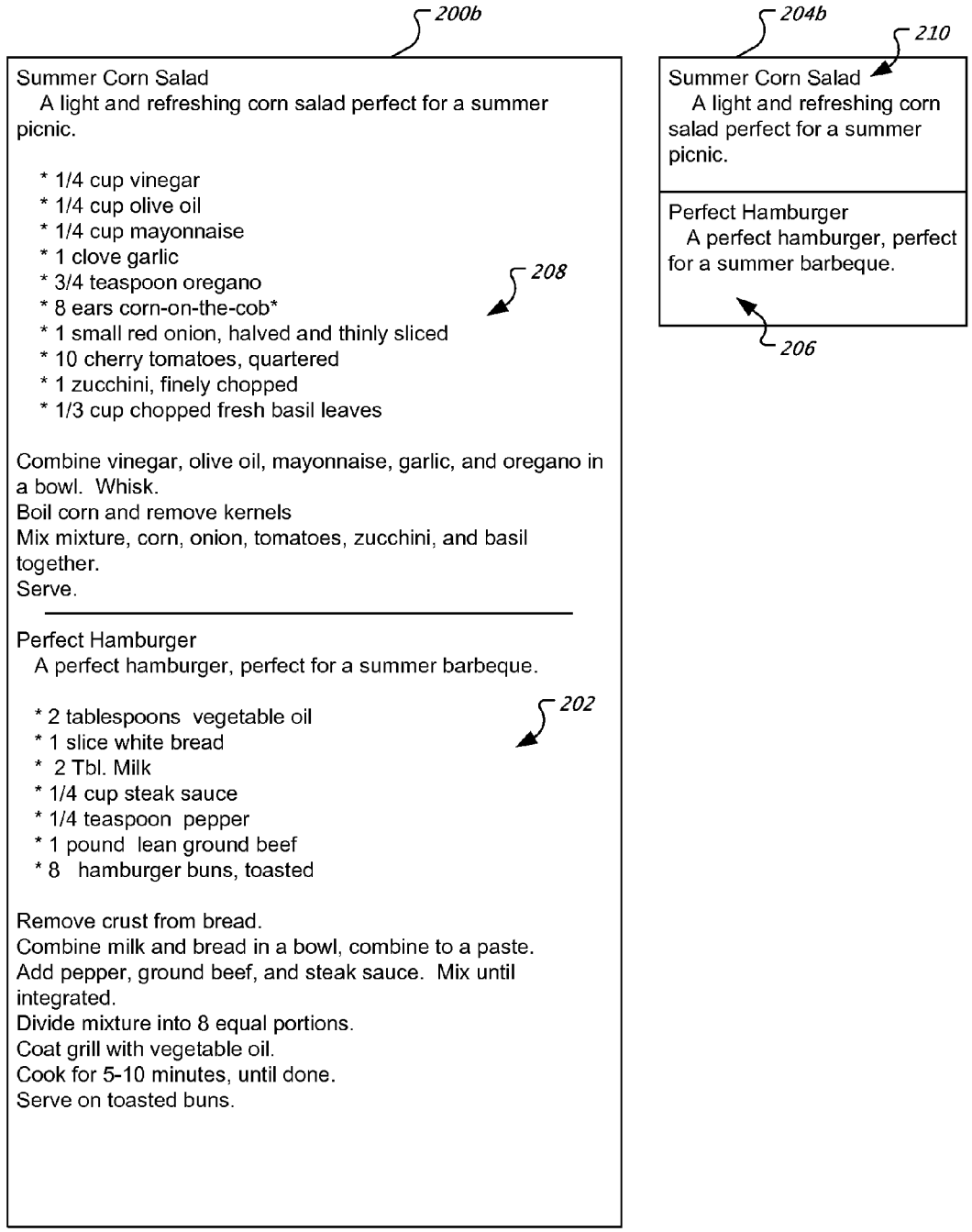

FIGS. 2A and 2B illustrate two versions of an example resource (e.g. a resource) paired with an example web feed. Referring to FIG. 2A, a version 200a of the resource includes an entry for a recipe for "Perfect Hamburger" 202. The resource is paired with a corresponding web feed 204a. The web feed 204a includes an item 206 for the "Perfect Hamburger" recipe. The resource is paired with a web feed through a link provided in the resource. For example, the Hypertext Markup Language (HTML) source of the resource 200a can include a link such as <link rel="alternate" type="application/rss+xml" title="Recipe" href="http://recipe//rss.xml"/>, which informs a web browser that the content of the resource 200a is reflected in a web feed available at "http://recipe//rss.xml".

Referring to FIG. 2B, a version of the resource after a content update is illustrated. The version 200b of the resource includes the entry for a recipe for "Perfect Hamburger" 202 and a new entry for a recipe for "Summer Corn Salad" 208. The web feed 204b has been updated to include an item for the "Summer Corn Salad" 210 in addition to the item 206 for the "Perfect Hamburger" recipe.

Generally, not all content updates result in the creation of an item in a web feed. Conventionally, a content creator decides whether a change to existing content or the addition of new content warrants the creation of an entry in the web feed. For example, certain portions of a webpage may be tagged so that items are added to web fees for the web page when content only in those certain portions are updated.

Figure 3:
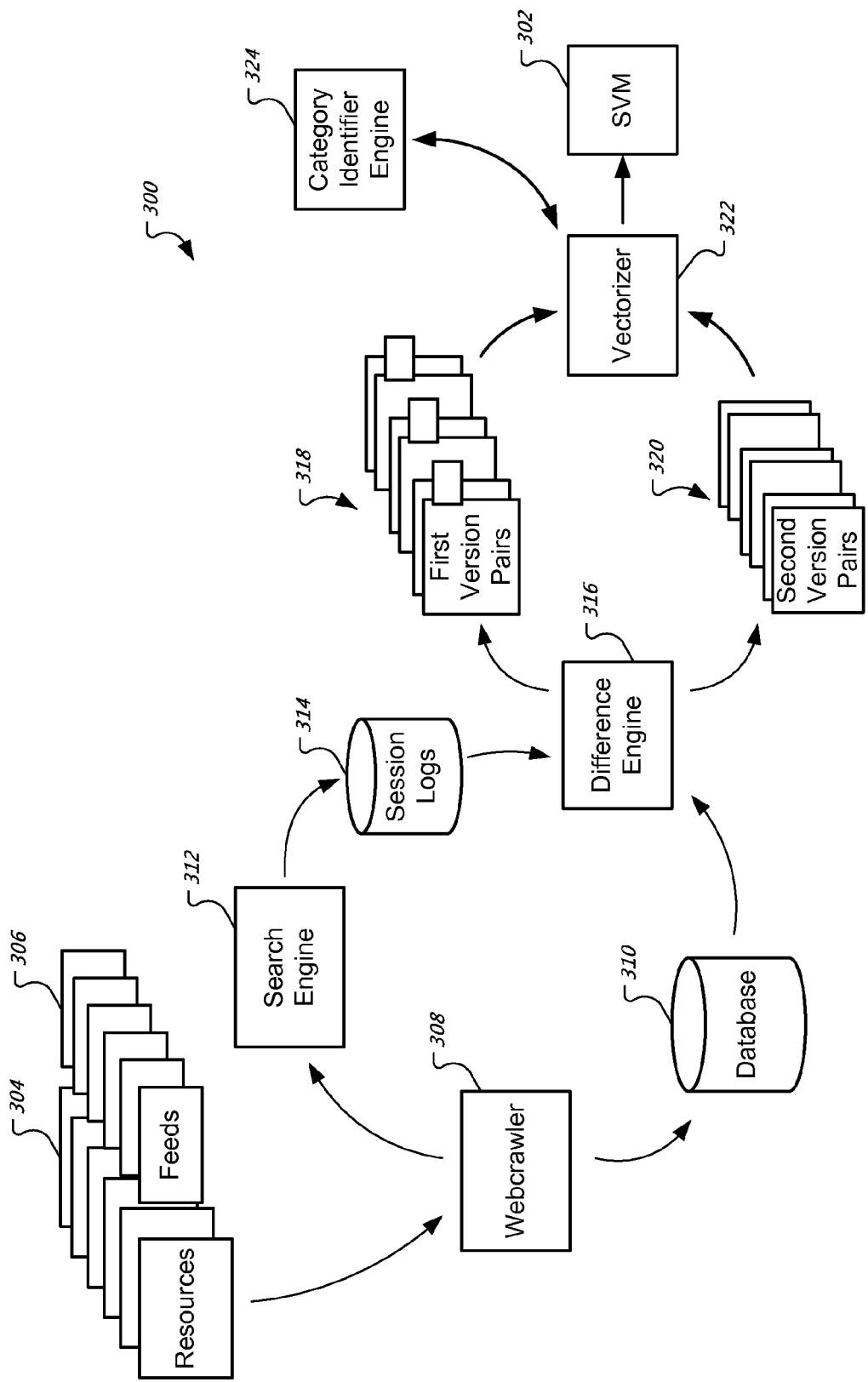
FIG. 3 illustrates an example system for training a support vector machine to classify changes to resources.

FIG. 3 illustrates an example system for training a support vector machine to classify changes to resources. Although a support vector machine is described, other machine learning systems and models can also be used instead of a support vector machine.

The system 300 trains a support vector machine 302 (SVM) to classify pairs of versions of resources as having changes that either warrant a change notification or do not warrant a change notification.

A web crawler 308 navigates networks of electronic resources 304 on a network. Some of the resources 304 are associated with web feeds 306. The web crawler copies the resources 304 and web feeds 306 and stores them in a memory storage device, e.g., database 310, or some other device. Over time, the web crawler obtains multiple versions of the resources 304 and multiple versions of the web feeds 306 (for example, the resource 200a and 200b and web feed 204a and 204b of FIGS. 2A and 2B).

The web crawler 308 also provides the resources 304 and feeds 306 to a search engine 312. The search engine 312 indexes resources and provides search results corresponding to the index resources in response to queries submitted by users. The search results are ordered based on a measure of relevance of the search result to the query. Users select search results that interest them. The search engine 312 can record information regarding users' selections of the results provided. For example, the search engine 312 can identify user selections (clicks) of individual search results. The search engine 312 can also identify queries submitted, the search results provided in response to each query, and the order in which the results were provided. The search engine 312 stores information about queries, results provided, the order of the results provided, and user selections in session logs 314.

A difference engine 316 identifies resources stored in the database 310 that are associated with web feeds. The difference engine identifies versions of the identified resources. As used herein, each version of a resource represents the resource at a point in time when the resource was obtained by the web crawler 308. Each version of a resource is different in content from other versions of the same resource. The difference engine 316 pairs the versions sequentially, such that each pair includes an earlier version and a later version. For example, if the web crawler 308 obtains three versions of a resource, one at 10:00 A.M., one at 12:00 P.M., and one at 2:00 P.M., the difference engine 316 pairs the 10:00 A.M. version with the 12:00 P.M. version and pairs the 12:00 P.M. version with the 2:00 P.M. version.

For each version pair, the difference engine determines if a change notification is attributable to the version pair. In some implementations, the difference engine 316 compares the web feed obtained concurrently with the earlier version (earlier web feed) of the version pair with the web feed obtained concurrently with the later version (later web feed). If the earlier web feed is different from the later web feed then the difference engine 316 determines that a change notification is attributable to the version pair. In other implementations, the difference engine 316 identifies one or more dates associated with items in the later web feed. For example, the difference engine may parse the later web feed, identify change notifications, and identify dates associated with each of those items. If the web feed includes a change notification with a date that occurs between the time the web crawler 308 obtained the earlier version and the time the web crawler 308 obtained the later version then the difference engine 316 determines that the corresponding change notification is attributable to the version pair.

The difference engine 316 classifies the version pairs that have attributable change notifications as a first set of version pairs 318 and the versions pairs that do not have an attributable change notification as a second set of version pairs 320 and sends the first and second sets of version pairs 318 and 320 to a vectorizer 322. The vectorizer 322 analyzes each version pair and determines features values of features that describe the versions individually and features values of features that describe differences between the versions.

Generally, features values determined by the vectorizer 322 can include content feature values of content features, structure feature values of structure features, and traffic feature values of traffic features. Content features are based on the content of versions in the version pair. Structure features are based on relationships between the versions in the version pair and other resources. Traffic features are based on users' interactions with the versions of the resource in conjunction with the search engine 312. Examples of these features are described below.

Content Features

Content features are based on the content of the resource. In some implementations, one or more content feature values can be determined based on term counts. A term count is the number of terms in a version of the resource. In some implementations, for HyperText Markup Language (HTML) documents, a term count can be determined at the HTML tag level (e.g., the number of terms in H1 tags) as well as the number of terms in the document. In other implementations, a term count can be determined for terms in DOM text nodes and the terms in of DOM elements. In general, content features can include term frequencies and inverse document frequency.

In some implementations, the term counts include delta term counts. One or more content feature values can be determined based on delta term counts. Delta term counts are the sum of the number of terms that must be changed, added, and deleted to the first version in order to obtain the second version. As described above, in some implementations a delta term count can be determined at the HTML tag level. In some implementations, the changing, adding, and deleting of terms is positional. For example, to change "black cat" to "cat black" would require two changes ("black" to "cat" and "cat" to "black").

In some implementations, content feature values can be determined based on a measure of categorical similarity between the versions of the resource. The vectorizer 322 sends each of the versions in the version pair to a category identifier engine 324. A variety of category identifier engines 324 can be used, such as clustering engines, for example. The category identifier engine 324 produces a vector including values that represent an association of the version to one or more categories based on a pre-defined taxonomy. In some implementations the vectorizer 322 accepts the vectors from the category identifier engine 324 and determines the dot product of the two vectors.

In some implementations, content feature values can be determined based on a measure of categorical similarity between the prior version of the resource and delta text for the pair of versions. Delta text is the union of the terms in the prior version that were removed (or changed) in the later version and all terms in the later version that are not in the prior version. Similar to the delta term count, delta text is positional. For example, the text "black cat" changed to "cat black" would result in the delta text "black cat cat black." As described above, a category identifier engine 324 accepts the delta terms and produces a vector including values that represent an association of the delta terms to one or more categories based on a pre-defined taxonomy. In some implementations, the vectorizer 322 calculates the dot product of the vector produced by the category identifier engine 324 using the delta terms and the vector produced by the category identifier engine 324 using the terms in the later version.

Content feature values for an HTML page can also be based on counts of HTML elements in the prior version and HTML elements in the later version. In some implementations, the vectorizer determines a count of HTML elements based on HTML tags. For example, the vectorizer may determine that the prior version of a HTML page includes 36 HTML tags, 10 "<h1>" tags, 5 "<table>" tags, 5 "<tr>" tags, 10 "<td>" tags, and 1 "<em>" tag and the later version of the HTML page includes 38 HTML tags, 11 "<h1>" tags, 5 "<table>" tags, 5 "<tr>" tags, 10 "<td>" tags, and 2 "<em>" tags.

Content feature values can include the number of named entities in the document. As used herein a named entity describes a specific entity as distinguished from a common class of entities, e.g. proper nouns, addresses, telephone numbers, prices, etc.

Content feature values can also be based on a count of high inverse document frequency (high idf) terms for each version. Inverse document frequency is a measure of how common a word is in a corpus of documents (e.g., resources), for example all of the documents in the database 310. Generally, words that appear less frequently in the corpus of documents are more significant than words that appear more frequently in the corpus. What constitutes a high-idf term is determined by a threshold value that can vary for each corpus.

Content feature values can be determined from the location of the delta text on a rendered HTML page. As used herein, the location of the delta text on a rendered HTML page is the location of text in a window of a browser after the browser has rendered the web page. The actual web page, however, need not be rendered to determine the location; for example, a virtual machine can process the HTML source code and calculate the location of the text on the rendered HTML page. For example, text appearing in the upper right hand corner of the page is generally more significant than text occurring at the bottom of the page. In some implementations, the content feature values can be determined based on whether the delta text would be visible on a conventional computer running a conventional web browser using a conventional font (e.g. a value of 1 if the delta text is visible, a value of 0 if it is not).

In some implementations, content features can include any language modeling statistics, such as term frequency and inverse term frequency. In some implementations, the language modeling statistics can be determined based on subdivisions of the resource. For example, for an HTML document, language modeling statistics can be determined for each nested level of an HTML tree structure.

Structure Features

Structure features are features derived from the graph structure of the World Wide Web. That is the links occurring between HTML pages on the World Wide Web. In some implementations, structure features are based on the ways that the resource is related to other resources. An example of structure feature values can include a remote inverse anchor count of the prior and later versions. A remote inverse anchor count is the number of resources from outside the resource's domain that link to the resource.

Structure feature values can include a domain inverse anchor count. A domain inverse anchor count is the number of resources within the resource's domain that link to the resource.

Structure feature values can also include a remote anchor count. A remote anchor count is the number of resources outside the resource's domain to which the resource links.

Structure feature values can include a domain anchor count. A domain anchor count is the number of resources within the resource's domain to which the resource links.

In some implementations, anchor counts can be weighted based on a measure of the importance of the linking or linked resource.

Structure feature values can include a measure of categorical similarity of the remote anchor text to a predefined taxonomy. Remote anchor text is the visible text on a version of a resource that corresponds to a link to another resource outside the resource's domain, (e.g., a link to a website www-.website.com may state "website.com has some of the best website domain name deals", in this example "website.com has some of the best website domain name deals" is the anchor text. In some implementations, a category identifier engine 324 processes the remote anchor text and produces a vector including values that represent an association of the delta terms to one or more categories based on a pre-defined taxonomy.

Structure feature values can include a measure of categorical similarity of the domain anchor text to a predefined taxonomy. Domain anchor text is the visible text on a version of a resource that corresponds to a link to another resource within the resource's domain, e.g., anchor text. In some implementations, a category identifier engine 324 processes the remote anchor text and produces a vector including values that represent an association of the delta terms to one or more categories based on a pre-defined taxonomy.

Structure feature values can include a measure of categorical similarity of the remote anchor text to a predefined taxonomy. Delta remote anchor text is changes (including additions and deletions) in the anchor text corresponding to links outside the resources domain. In some implementations, a category identifier engine accepts the delta remote anchor text and produces a vector including values that represent an association of the delta terms to one or more categories based on a pre-defined taxonomy. In other implementations, the category engine produces separate vectors for the anchor text from the prior version and the anchor text for the later version. The vectorizer then calculates the dot product of the vectors.

Structure feature values can include a measure of categorical similarity of the delta domain anchor text to a predefined taxonomy. Delta domain anchor text is changes (including additions and deletions) in the anchor text that corresponds to links within the resources domain. In some implementations, a category identifier engine accepts the delta domain anchor text and produces a vector including values which represent an association of the delta terms to one or more categories based on a pre-defined taxonomy. In other implementations, the category engine produces separate vectors for the anchor text from the prior version and the anchor text for the later version. The vectorizer then calculates the dot product of the vectors.

Structure feature values can also be based on change in a count of all resources located within n-link navigations of each of the versions. In some implementations, n is equal to two, and thus the count is based on all resources within two links of the resource.

For example, if a resource "A" contains only a link to a resource "B", then the count of resources located within two link navigations of "A" would include resource "B" and all of the resources that "B" links to. The change is the difference between the number of documents within two link navigations of the prior version and the number of documents within two link navigations of the later version. In some implementations, the counts can include incoming navigations. For example, for resource "A" if resource "X" links to resource "Y" and resource "Y" links to resource "A" then the count would include resource "X" and resource "Y" even if resource "A" does not link to either.

Traffic Features

Traffic feature values are based on features that reflect users' interactions with the versions of the resource when the resources is indexed in a search engine and referenced in search results presented to the users. Traffic based feature values are derived from aggregating actions that are performed over a period of time (e.g. a day, a week, a month).

Traffic based feature values can include a count of the number of times a search result referencing each version was selected (clicked) over the period. In some implementations, the count of the number of times a search result referencing each version was selected is determined separately for each day of the week.

Traffic based feature values can include a count of the number of times a cached version reference in a search result is clicked over the period. A cached search result is a request to the search engine 312 to view the version of the resource stored in the database 310 as opposed to navigating the user directly to the resource.

Traffic based feature values can include a count of the number of times a search result referencing each version was presented as a top search result (e.g. the search result was presented in the top 5, 10, or 20 search results) over the period. In some implementations, the count is determined separately for each day of the week.

Traffic based feature values can include a count of the number of queries submitted to the search engine that produced search results that referenced each version over the period. In some implementations, the count is determined separately for each day of the week.

Processing the Feature Values

The feature values are collected into a feature vector. In some implementations, the feature vector is sent to the SVM 302 along with an indicator as to whether the version pair to which the vector corresponds is associated with a change notification.

In general, the SVM is a classifier. Given a set of training examples and testing examples (e.g., feature vectors selected for training and separate feature vectors selected for testing) and respective indicators that indicate whether the respective training example belongs to the first set of version pairs 318 or the second set of version pairs 320 (e.g., whether a change notification is attributable to the version pair that was used to create the feature vector), the SVM builds a model that predicts whether a new example falls into one category or the other.

Various training techniques can be used to train the SVM. Additionally, other predictive models instead of a SVM can also be used, e.g., logistic regression models, etc. Once the SVM is trained, it is used to determine if a change notification (e.g., a web feed) should be generated for an updated resource.

Figure 4:
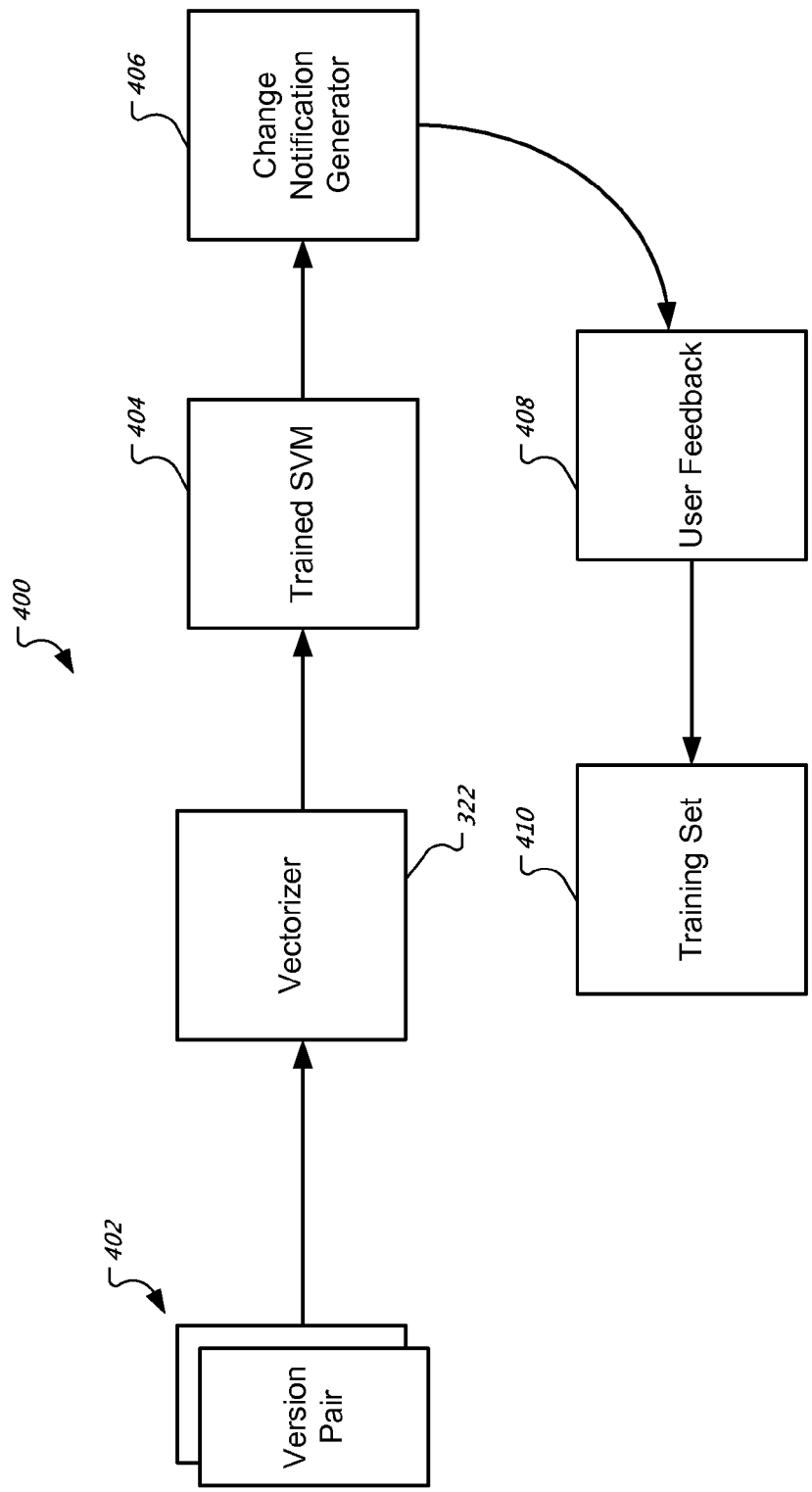
FIG. 4 illustrates an example system for using a trained support vector machine to determine if a web feed should be generated.

FIG. 4 illustrates an example system for using a trained support vector machine to determine if a web feed should be generated. The system 400 identifies a version pair of a resource 402 (e.g. an HTML page) for which a web feed entry may be generated. Generally, the versions are consecutive versions of the resource obtained by a web crawler (e.g. the web crawler 308 of FIG. 3). The vectorizer 322 accepts the version pair 402 and generates a feature vector. For example, the feature vector described above with respect to FIG. 3.

The feature vector is supplied to a trained SVM 404, for example, an SVM trained by the system described in FIG. 3. The trained SVM 404 classifies the version pair 402 as either warranting an association with an item in a web feed or not.

Based on the classification and the version pair of the resource, a change notification generator 406 creates change notifications corresponding to the differences between the prior version and the later version of the version pair 402. For example, the change notification generator 406 can obtain visible text occurring in the later version and not occurring in the prior version to provide the text of the change notification.

Figure 5:
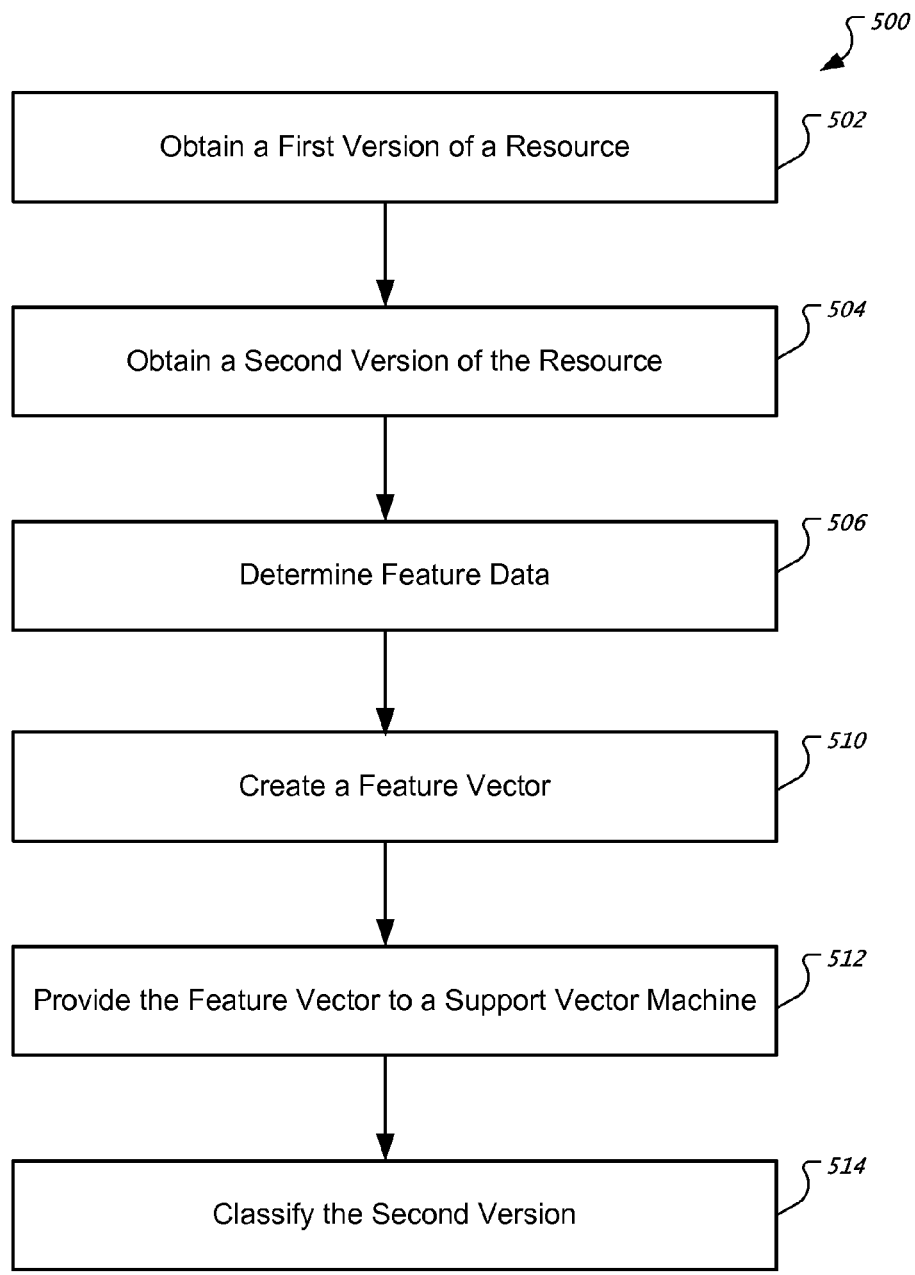
FIG. 5 illustrates an example process for classifying version pairs as requiring a change notification or as not requiring a change notification.

In some implementations, the system can collect user feedback 408 as to whether the version pair of a resource should have generated a change notification. For example, a user may indicate that a particular change notification should not have been generated or may indicate that a change notification should have been generated at a particular point. The version pair of the resource along with the user feedback can be added to a training set 410 to be used in subsequent SVM training FIG. 5 illustrates an example process 500 for classifying version pairs as requiring a change notification or not requiring a change notification. The process 500 can, for example, be implemented in the classification system 400 of FIG. 4, or in some other processing system.

The process obtains a first version of a resource (502). The process can obtain the first version of the resource using a web crawler, for example, the web crawler 308 of FIG. 3.

The process obtains a second version of the resource (504), the second version representing a change to the first version of the resource. The process can obtain the second version of the resource using a web crawler, for example, the web crawler 308 of FIG. 3.

The process determines feature data (506) that describes differences between the second version and the first version. In general, feature data can include content feature data. The content feature data describes the content of the first version, the content of the second version, and differences between the content of the first version and the second version. Feature data can also include structure feature data. Structure feature data describes the relationships between the first version and other resources, the second version and other resources, and the traffic feature data describes changes in the amount and quality of user interactions with the resource.

The process creates a feature vector (510) from the content features and the structure features. For example, the process creates a feature vector that describes changes in the second version from the first version based on one or more of content feature values, structure feature values, and traffic feature values.

The process provides the feature vector to a support vector machine (512). The support vector machine is trained to classify the second version of the resource as warranting an association with a change notification.

The process classifies the second version (514) as requiring a change notification or not requiring a change notification based on the output.

Figure 6:
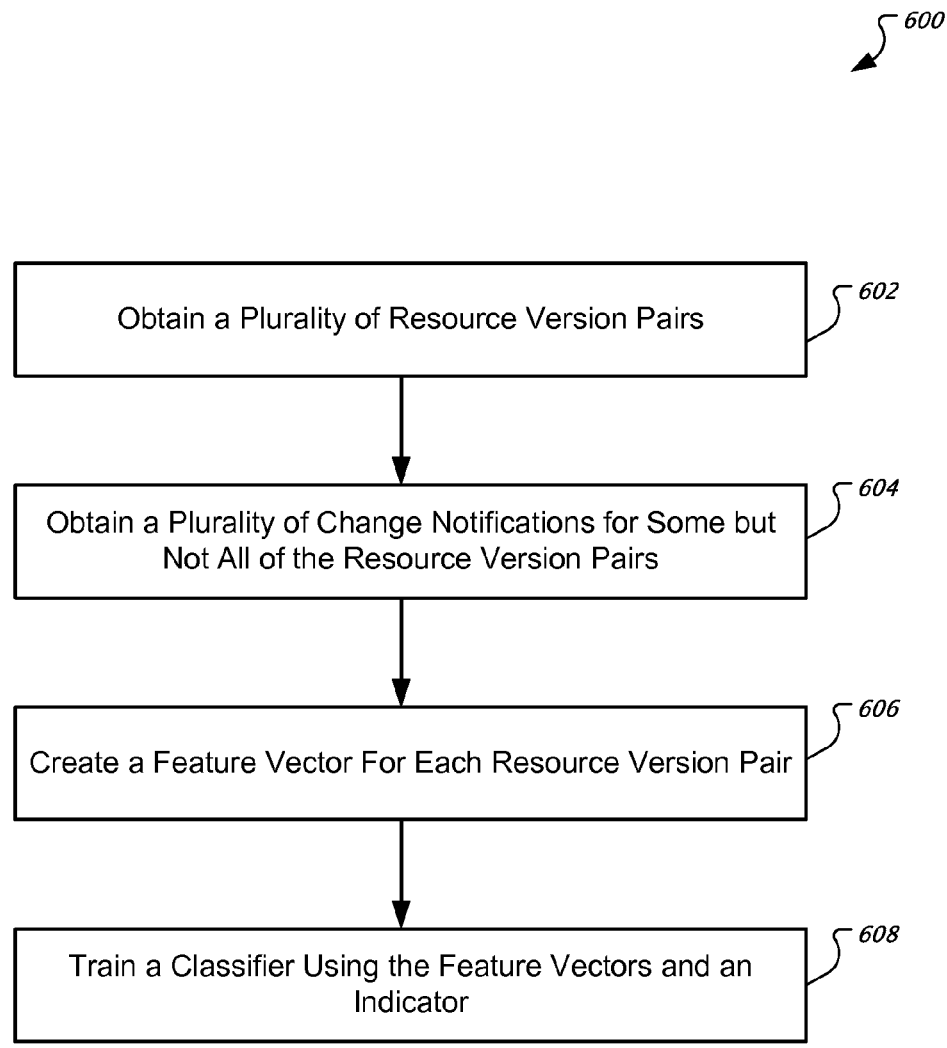
FIG. 6 illustrates an example process for training a classifier.

FIG. 6 illustrates an example process for training a classifier. The process 600 can, for example, be implemented in the training system 300 of FIG. 3, or in some other processing system.

The process obtains a plurality of resource version pairs (602), each resource version pair having a first version of a resource obtained at a first time and a second version of the resource obtained at a second time. Versions of the resources can be obtained by a web crawler, for example, the web crawler 308 of FIG. 3.

The process obtains a plurality of change notifications for a proper subset of the resource version pairs (604), the change notification identifying change occurring between the first version and the second version of the corresponding resource. For example, change notifications may be provided for some, but not all, of the resource version pairs, as change notifications may not have been generated for every version change. The process trains a classifier to determine if changes to a resource warrant a change notification. Therefore, a training set of data requires examples of version pairs where a change notification was generated and examples of version pairs where a change notification could have been but was not generated. For example, the process may obtain versions of a resource where the resource is associated with a web feed. For some of the version pairs of the resource a change notification was generated and for other changes to the resource a change notification was not generated.

The process creates a feature vector for each resource version pair (606). The feature may be created as described above with reference to FIG. 3.

The process trains a classifier using the feature vectors and a corresponding indicator (608), the indicator indicating if a change notification exists for the corresponding resource version pair. The classifier can be, for example, a support vector machine.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending resources to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   obtaining a first version of a resource;
   obtaining a second version of the resource, the second version representing a change to the first version of the resource;
   determining feature data, wherein determining the feature data comprises determining content feature data that describes changes in the content from the first version to the second version, wherein determining content feature data comprises:
      calculating a term count difference based on a count of terms in the first version and a count of terms in the second version;
      calculating a delta term count based on:
         a number of terms deleted from the first version to produce the second version;
         a number of terms added to the first version to produce the second version; and
         a number of terms changed in the first version to produce the second version;
      creating content feature data based on the term count difference and the delta term count;
   creating a feature vector from the content feature data;
   providing the feature vector to a support vector machine, the support vector machine trained to classify the second version of the resource as having one of changes requiring a change notification or changes not requiring a change notification; and
   classifying the second version as requiring a change notification or not requiring a change notification based on output from the support vector machine.

2. The method of claim 1, further comprising:
   generating a change notification in response to classifying the second version of the resource as having a change requiring notification, the change notification including change data describing at least one change from the first version to the second version.

3. The method of claim 1, wherein determining feature data comprises:
   determining structure feature data that describes changes in link relationships between the first version and a first plurality of other resources and link relationships between the second version and a second plurality of other resources.

4. The method of claim 1, wherein:
   the resource is an HTML page; and
   creating content feature data comprises:
      calculating an element count difference based on a count of HTML elements occurring in the first version and a count of HTML elements occurring in the second version; and
      creating content feature data based on the element count difference.

5. The method of claim 3, wherein determining structure feature data comprises:

identifying a first number of resources in the first plurality of other resources that link to the first version;

identifying a second number of resources in the second plurality of other resources that link to the second version; and creating the structure feature data based on the first number and the second number.

6. The method of claim 5, wherein determining structure feature data further comprises:

identifying a first set of anchor text from the links of the first plurality of other resources to the first version;

identifying a second set of anchor text from the links of the second plurality of other resources to the second version; and creating structure feature data based on the first set of anchor text and the second set of anchor text.

7. The method of claim 1, further comprising determining traffic feature data based on interactions of a first plurality of users with the first version and interactions of a second plurality of users with the second version.

8. The method of claim 7, wherein determining traffic feature data comprises:

determining a first count of user interactions with the first version;

determining a second count of user interactions with the second version; and creating traffic feature data based on the first count and the second count.

9. The method of claim 7, wherein determining traffic feature data comprises:

determining a first count of a number of times a search result identifying the first version was presented in response to search queries submitted to a search engine; and determining a second count of a number of times a search result identifying the second version was presented in response to a query submitted by a user of the second plurality of users; and creating traffic feature data based on the first count and the second count.

10. The method of claim 7, wherein determining traffic feature data comprises:

determining a first count of queries submitted by the first plurality of users and for which search results identifying the first version were generated;

determining a second count of queries submitted by the second plurality of users and for which search results identifying the second version were generated; and creating a traffic feature data based on the first count and the second count.

11. A method performed by data processing apparatus, the method comprising:

obtaining a plurality of resource version pairs, each resource version pair having a first version of a resource obtained at a first time and a second version of the resource obtained at a second time;

obtaining a plurality of change notifications for a proper subset of the resource version pairs, each of the change notifications identifying change occurring between content of a first version and a second version of a resource to which the change notification corresponds;

for each resource version pair calculating a term count difference based on a count of terms in the first version and a count of terms in the second version;

for each resource version pair calculating a delta term count based on:

a number of terms deleted from the first version to produce the second version;

a number of terms added to the first version to produce the second version; and a number of terms changed in the first version to produce the second version;

for each resource version pair creating content feature data that describes the differences between the content of the first version and the second version based on the term count difference and the delta term count;

for each resource version pair creating a feature vector from the content feature data;

for each resource version pair creating a notification indicator for the resource version pair, the notification indicator indicating if a change notification exists for the corresponding resource version pair; and training a classifier to classify the second version of the resource as having changes requiring a change notification or changes not requiring a change notification using the feature vectors and the corresponding indicators.

12. The method of claim 11, wherein each of the resources is associated with a web feed, and the change notification is a change notification corresponding to the first version and the second version of the corresponding resource.

13. A non-transitory computer storage medium encoded with a computer program, the program comprising instructions that when executed by data processing apparatus cause the data processing apparatus to perform operations comprising:

obtaining a first version of a resource;

obtaining a second version of the resource, the second version representing a change to the first version of the resource;

determining feature data, wherein determining the feature data comprises determining content feature data that describes changes in the content from the first version to the second version, wherein determining content feature data comprises:

calculating a term count difference based on a count of terms in the first version and a count of terms in the second version;

calculating a delta term count based on:

a number of terms deleted from the first version to produce the second version;

a number of terms added to the first version to produce the second version; and a number of terms changed in the first version to produce the second version;

creating content feature data based on the term count difference and the delta term count;

creating a feature vector from the content feature data;

providing the feature vector to a support vector machine, the support vector machine trained to classify the second version of the resource as having one of changes requiring a change notification or changes not requiring a change notification; and classifying the second version as requiring a change notification or not requiring a change notification based on output from the support vector machine.

14. A non-transitory computer storage medium encoded with a computer program, the program comprising instructions that when executed by data processing apparatus cause the data processing apparatus to perform operations comprising:

obtaining a plurality of resource version pairs, each resource version pair having a first version of a resource obtained at a first time and a second version of the resource obtained at a second time;

obtaining a plurality of change notifications for a proper subset of the resource version pairs, each of the change notifications identifying change occurring between content of a first version and a second version of a resource to which the change notification corresponds;

for each resource version pair calculating a term count difference based on a count of terms in the first version and a count of terms in the second version;

for each resource version pair calculating a delta term count based on:
 a number of terms deleted from the first version to produce the second version;
 a number of terms added to the first version to produce the second version; and
 a number of terms changed in the first version to produce the second version;

for each resource version pair creating content feature data that describes the differences between the content of the first version and the second version based on the term count difference and the delta term count;

for each resource version pair creating a feature vector from the content feature data;

for each resource version pair creating a notification indicator for the resource version pair, the notification indicator indicating if a change notification exists for the corresponding resource version pair; and training a classifier to classify the second version of the resource as having changes requiring a change notification or changes not requiring a change notification using the feature vectors and the corresponding indicators.

15. A system comprising:
a user device; and
one or more computers operable to interact with the device and to:
 obtaining a first version of a resource;
 obtaining a second version of the resource, the second version representing a change to the first version of the resource;
 determining feature data, wherein determining the feature data comprises determining content feature data that describes changes in the content from the first version to the second version, wherein determining content feature data comprises:
  calculating a term count difference based on a count of terms in the first version and a count of terms in the second version;
  calculating a delta term count based on:
   a number of terms deleted from the first version to produce the second version;
   a number of terms added to the first version to produce the second version; and
   a number of terms changed in the first version to produce the second version;
  creating content feature data based on the term count difference and the delta term count;
 creating a feature vector from the content feature data;
 providing the feature vector to a support vector machine, the support vector machine trained to classify the second version of the resource as having one of changes requiring a change notification or changes not requiring a change notification; and
 classifying the second version as requiring a change notification or not requiring a change notification based on output from the support vector machine.

16. The system of claim 15, further comprising:
generating a change notification in response to classifying the second version of the resource as having a changes requiring notification, the change notification including change data describing at least one change from the first version to the second version.

17. The system of claim 15, wherein determining feature data comprises:
determining structure feature data that describes changes in link relationships between the first version and a first plurality of other resources and link relationships between the second version and a second plurality of other resources.

18. The system of claim 15, wherein:
the resource is an HTML page; and
creating content feature data comprises:
 calculating an element count difference based on a count of HTML elements occurring in the first version and a count of HTML elements occurring in the second version; and
 creating content feature data based on the element count difference.

19. The system of claim 17, wherein determining structure feature data comprises:
identifying a first number of resources in the first plurality of other resources that link to the first version;
identifying a second number of resources in the second plurality of other resources that link to the second version; and
creating the structure feature data based on the first number and the second number.

20. The system of claim 19, wherein determining structure feature data further comprises:
identifying a first set of anchor text from the links of the first plurality of other resources to the first version;
identifying a second set of anchor text from the links of the second plurality of other resources to the second version; and
creating structure feature data based on the first set of anchor text and the second set of anchor text.

21. The system of claim 17, further comprising determining traffic feature data based on interactions of a first plurality of users with the first version and interactions of a second plurality of users with the second version.

22. The system of claim 21, wherein determining traffic feature data comprises:
determining a first count of user interactions with the first version;
determining a second count of user interactions with the second version; and
creating traffic feature data based on the first count and the second count.

23. The system of claim 21, wherein determining traffic feature data comprises:
determining a first count of a number of times a search result identifying the first version was presented in response to search queries submitted to a search engine; and
determining a second count of a number of times a search result identifying the second version was presented in response to a query submitted by a user of the second plurality of users; and
creating traffic feature data based on the first count and the second count.

24. The system of claim 21, wherein determining traffic feature data comprises:

determining a first count of queries submitted by the first plurality of users and for which search results identifying the first version were generated;

determining a second count of queries submitted by the second plurality of users and for which search results identifying the second version were generated; and creating a traffic feature data based on the first count and the second count.

25. A system comprising:

a user device; and one or more computers operable to interact with the device and to:

obtaining a plurality of resource version pairs, each resource version pair having a first version of a resource obtained at a first time and a second version of the resource obtained at a second time;

obtaining a plurality of change notifications for a proper subset of the resource version pairs, each of the change notifications identifying change occurring between content of a first version and a second version of a resource to which the change notification corresponds;

for each resource version pair calculating a term count difference based on a count of terms in the first version and a count of terms in the second version;

for each resource version pair calculating a delta term count based on:

a number of terms deleted from the first version to produce the second version;

a number of terms added to the first version to produce the second version; and a number of terms changed in the first version to produce the second version;

for each resource version pair creating content feature data that describes the differences between the content of the first version and the second version based on the term count difference and the delta term count;

for each resource version pair creating a feature vector from the content feature data;

for each resource version pair creating a notification indicator for the resource version pair, the notification indicator indicating if a change notification exists for the corresponding resource version pair; and training a classifier to classify the second version of the resource as having changes requiring a change notification or changes not requiring a change notification using the feature vectors and the corresponding indicators.

26. The system of claim 25, wherein each of the resources is associated with a web feed, and the change notification is a change notification corresponding to the first version and the second version of the corresponding resource.

\* \* \* \* \*

UNITED STATES PATENT AND TRADEMARK OFFICE
CERTIFICATE OF CORRECTION

PATENT NO.       : 8,607,140 B1                                              Page 1 of 1
APPLICATION NO. : 12/973977
DATED            : December 10, 2013
INVENTOR(S)      : Pascovici et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 498 days.

Signed and Sealed this

Twenty-third Day of May, 2017

Michelle K. Lee
*Director of the United States Patent and Trademark Office*